United States Patent
Bang et al.

(10) Patent No.: US 8,267,629 B2
(45) Date of Patent: Sep. 18, 2012

(54) MOUNTING STRUCTURE FOR BOSS OF DISPLAY MODULE

(75) Inventors: Won-Kyu Bang, Suwon-si (KR); Myoung-Kon Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1227 days.

(21) Appl. No.: 11/783,389

(22) Filed: Apr. 9, 2007

(65) Prior Publication Data
US 2007/0267549 A1 Nov. 22, 2007

(30) Foreign Application Priority Data
May 17, 2006 (KR) .................. 10-2006-0044269

(51) Int. Cl.
*F16B 37/04* (2006.01)

(52) U.S. Cl. ........ 411/172; 411/109; 411/174; 411/175; 411/395

(58) Field of Classification Search ................. 313/582; 439/160; 411/103, 104, 106, 108, 109, 133, 411/172–175, 339, 368, 395; 248/122.1
See application file for complete search history.

(56) References Cited

U.S. PATENT DOCUMENTS

| | | | | |
|---|---|---|---|---|
| 361,985 A | * | 4/1887 | Bush | 238/367 |
| 827,230 A | * | 7/1906 | Goeppinger | 411/368 |
| 972,787 A | * | 10/1910 | Huyck | 403/247 |
| 1,545,211 A | * | 7/1925 | Storz | 30/266 |
| 1,857,620 A | * | 5/1932 | McCleane | 228/131 |
| 1,973,170 A | * | 9/1934 | Jacobi | 411/395 |
| 2,273,102 A | * | 2/1942 | Harris et al. | 403/373 |
| 3,066,581 A | * | 12/1962 | Goldbeck | 404/70 |
| 3,259,404 A | * | 7/1966 | Papenguth | 285/212 |
| 3,279,518 A | * | 10/1966 | Bollinger | 411/166 |
| 3,352,189 A | * | 11/1967 | Brown | 411/391 |
| 4,739,601 A | * | 4/1988 | Beine | 52/710 |
| 5,037,259 A | * | 8/1991 | Duran et al. | 411/173 |

(Continued)

FOREIGN PATENT DOCUMENTS
KR 10-2004-0016297 2/2004
(Continued)

OTHER PUBLICATIONS

Korean Office Action corresponding to Korean Patent Application No. 10-2006-0044269, issued on Apr. 30, 2007.

*Primary Examiner* — Victor Batson
*Assistant Examiner* — Roberta Delisle
(74) *Attorney, Agent, or Firm* — Robert E. Bushnell, Esq.

(57) ABSTRACT

A mounting structure for a boss of a display module. The mounting structure is constructed with a reinforcing member installed on a chassis base of the display module, a boss including a threaded length having an outer portion on which a screw surface is formed and being coupled to the reinforcing member, and a connecting portion extending from the threaded length in a direction away from the reinforcing member and having an end portion in which a coupling hole is formed, and a supporting nut screwed into the threaded length to press the boss toward the reinforcing member.

13 Claims, 5 Drawing Sheets

U.S. PATENT DOCUMENTS

| | | | | |
|---|---|---|---|---|
| 6,095,733 | A | * | 8/2000 | Busby et al. ................... 411/10 |
| 6,158,177 | A | * | 12/2000 | Blobaum ........................ 52/208 |
| 6,256,075 | B1 | * | 7/2001 | Yang ............................ 348/843 |
| 6,347,042 | B1 | * | 2/2002 | White ........................... 361/784 |
| 6,430,756 | B1 | * | 8/2002 | Reilly ........................... 4/252.1 |
| 6,461,093 | B1 | * | 10/2002 | Junkers ........................ 411/432 |
| 6,871,826 | B2 | * | 3/2005 | Oyama et al. ............. 248/188.8 |
| 7,259,958 | B2 | * | 8/2007 | Bang et al. ............... 361/679.27 |
| 7,284,939 | B2 | * | 10/2007 | Nakagami .................... 411/238 |
| 7,592,749 | B2 | * | 9/2009 | Kim et al. .................... 313/582 |
| 7,706,139 | B2 | * | 4/2010 | Kim ........................ 361/679.21 |
| 2005/0047100 | A1 | * | 3/2005 | Kim ............................... 361/758 |
| 2006/0160387 | A1 | * | 7/2006 | Kim et al. .................... 439/160 |
| 2006/0228194 | A1 | * | 10/2006 | Nilsen et al. ................. 411/546 |
| 2007/0008686 | A1 | | 1/2007 | Jang |

FOREIGN PATENT DOCUMENTS

KR  10-2005-0035311  4/2005

* cited by examiner

MOUNTING STRUCTURE FOR BOSS OF DISPLAY MODULE

CLAIM OF PRIORITY

This application makes reference to, incorporates the same herein, and claims all benefits accruing under 35 U.S.C. §119 from an application for MOUNTING STRUCTURE FOR BOSS OF DISPLAY MODULE earlier filed in the Korean Intellectual Property Office on 17 May 2006 and there duly assigned Serial No. 10-2006-0044269.

BACKGROUND OF THE INVENTION

1. Field of the Invention

The present invention relates to a mounting structure for a boss of a display module, and more particularly, to a mounting structure for a boss of a display module, which can resist deformation and can support a plasma display apparatus firmly and stably.

2. Description of the Related Art

Plasma display apparatuses are flat panel display apparatuses, in which electrodes are formed on facing surfaces of substrates, a discharge gas is injected into a space between the substrates and a power is applied to generate ultraviolet rays, which in turn excite visible rays to display video images. The plasma display apparatus can be fabricated to have a thin thickness of a few centimeters or less, and can have a large screen with a wide viewing angle of 150° or larger. Therefore, plasma display apparatuses are considered as next generation image display apparatuses.

A display module in the plasma display apparatus is typically constructed with a plasma display panel displaying images, a chassis base disposed in parallel to the plasma display panel, and a circuit board mounted on a rear portion of the chassis base to drive the plasma display panel.

Since plasma display apparatuses generally have a large size, a method of mounting plasma display apparatuses is different from that of contemporary televisions. That is, plasma display apparatuses can be installed on their own stands, or can be hung on the wall. The chassis base, forming the display module includes a support member for supporting the plasma display apparatus.

The chassis of the display module includes a boss, which is used as a support member when the plasma display apparatus is hung on a wall or when a cabinet and a display module are assembled with each other. The boss can be directly installed onto the chassis base, or can be installed on a reinforcing member that is attached to the chassis base. The boss must stably support the display apparatus while the display apparatus is mounted or hung on the wall.

The chassis base is formed as a thin plate by die-casting or pressing a metal blank having high rigidity and high thermal conductivity such as aluminum. Therefore, if the boss is directly installed onto the chassis base, the chassis base deforms around the boss. In addition, the thin plate structure of the chassis base cannot bear the weight of the entire display apparatus.

Therefore, the boss is generally installed on the reinforcing member that is attached to the chassis base. The reinforcing member ensures greater strength than the chassis base. Even if the boss is installed on the reinforcing member, however, stress concentration occurs, that is, the weight of the plasma display apparatus is concentrated on a coupling portion between the boss and the reinforcing member, and thus, the reinforcing member may-be deformed by the weight of the display apparatus and the boss may be bended.

Therefore, a mounting structure for the boss of the display module, which can stably maintain the mounting state without deformation when a large amount of load is applied, is required.

SUMMARY OF THE INVENTION

It is therefore an object of the present invention to provide an improved display module in a plasma display apparatus.

It is another object of the present invention to provide a mounting structure for a boss of a display module, which can firmly and stably support a plasma display apparatus.

The present invention also provides an improved mounting structure for a boss of a display module, which prevents deformation of the boss and a chassis in the display module.

According to an aspect of the present invention, a mounting structure for a boss of a display module is constructed with: a reinforcing member installed on a chassis base of the display module; a boss including a threaded length, which has an outer portion on which a screw surface is formed and which is coupled to the reinforcing member, and a connecting portion which extends from the threaded length in a direction away from the reinforcing member and has an end portion in which a coupling hole is formed; and a supporting nut screwed into the threaded length to press the boss toward the reinforcing member.

An end portion of the threaded length of the boss may be screwed onto the reinforcing member.

The boss may further include a head portion outwardly extending from an end portion of the threaded length, and the boss may be coupled to the reinforcing member by pressing the head portion into the reinforcing member.

The connecting portion may include a screw surface extending from the spiral portion of the threaded length on an outer portion of the connecting portion.

At least one cut surface may be formed on an outer surface of the connecting portion and extending in an axial direction of the boss.

The supporting nut may be coupled to the boss with a washer interposed between the supporting nut and the reinforcing member.

According to another aspect of the present invention, a mounting structure for a boss of a display module is constructed with: a boss including a threaded length, which has an outer portion on which a screw surface is formed and is coupled to a chassis base, and a connecting portion which extends from the threaded length in a direction away from the chassis base and has an end portion in which a coupling hole is formed; and a supporting nut screwed onto the threaded length to press the boss toward the chassis base.

The chassis base may include a protrusion portion having a penetration hole corresponding to the threaded length of the boss, and an end portion of the threaded length is screwed into the penetration hole of the protrusion portion.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Structures and operations of a mounting structure for a boss of a display module according to embodiments of the present invention will be described with reference to the accompanying drawings.

Figure 1:
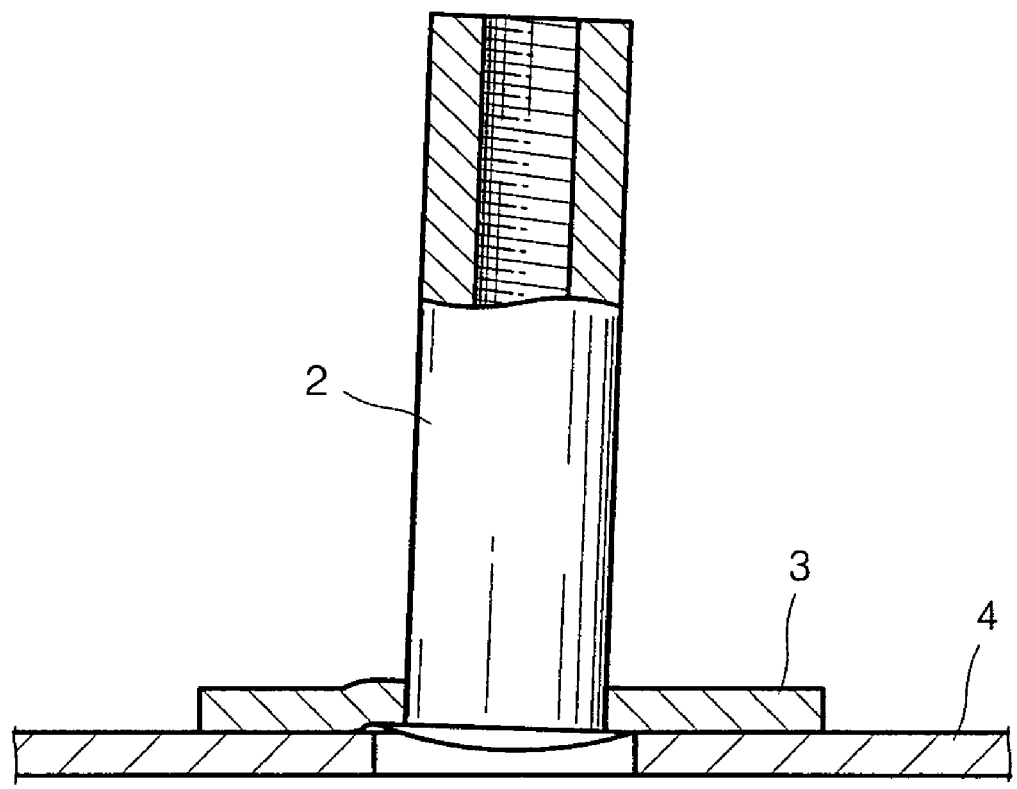
FIG. 1 is a side view of an example of deformation in a mounting structure for a boss of a contemporary display module.

FIG. 1 is a cross-sectional view showing an example of deformation of a boss mounting structure in a contemporary display module. Referring to FIG. 1, a boss 2 installed on a reinforcing member 3 that is mounted on a chassis base 4 is deformed by the weight of the plasma display apparatus, and reinforcing member 3 supporting boss 2 is also deformed.

Figure 2:
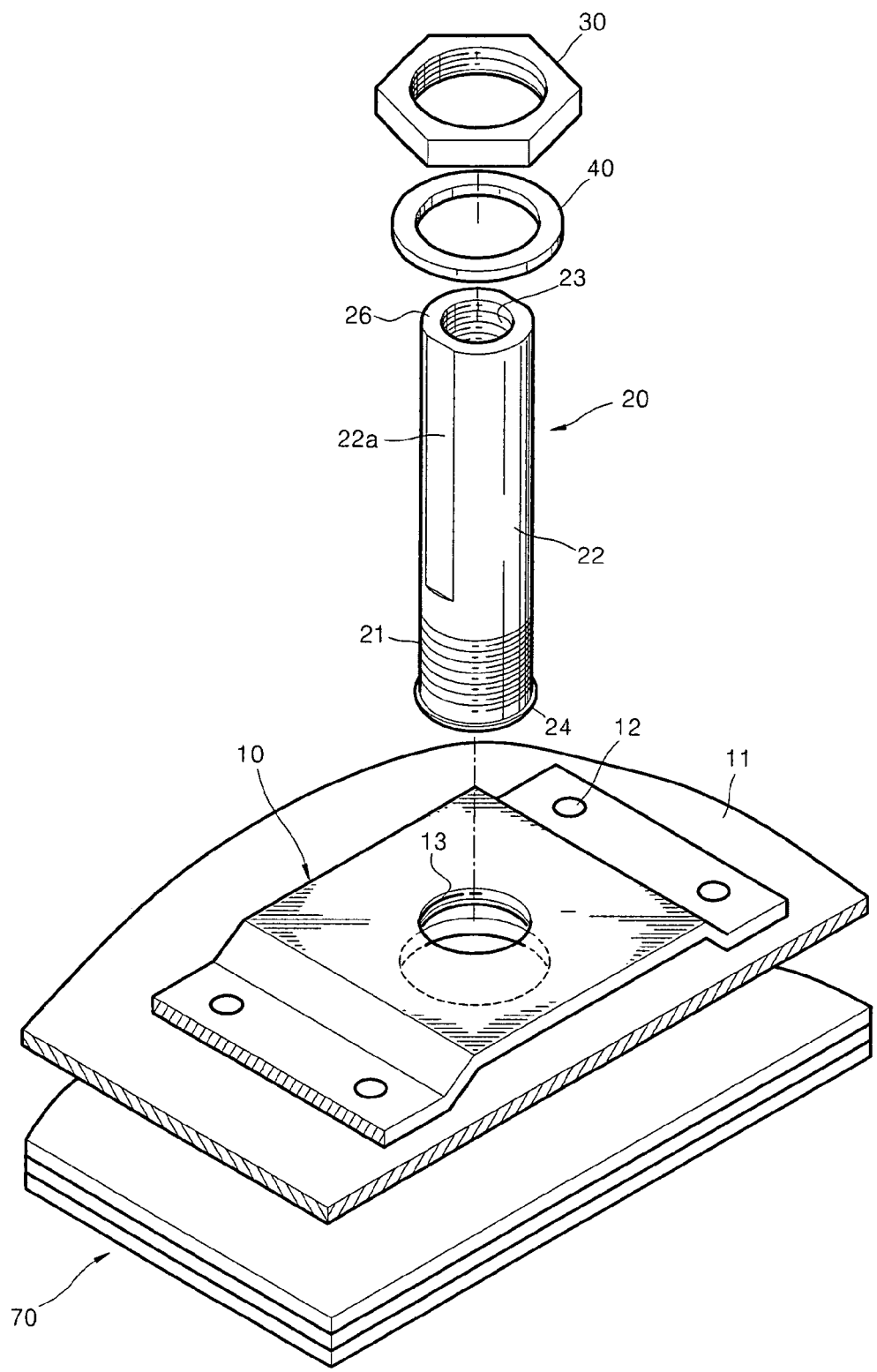
FIG. 2 is an exploded perspective view of a mounting structure for a boss of a display module according to an embodiment of the present invention.
Figure 3:
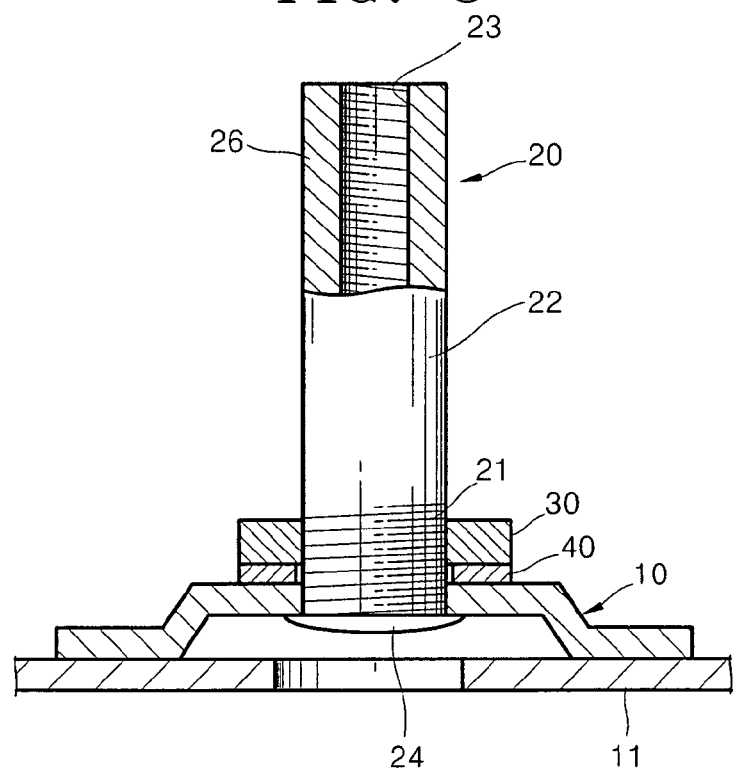
FIG. 3 is a cross-sectional view showing a side portion of the mounting structure of FIG. 2 in an assembled state.

FIG. 2 is an exploded perspective view of a mounting structure for a boss of a display module constructed as an embodiment of the principles of the present invention, and FIG. 3 is a cross-sectional view showing a side portion of the mounting structure of FIG. 2 in an assembled state.

The boss mounting structure shown in FIGS. 2 and 3 includes a reinforcing member 10 installed on a chassis base 11, a boss 20 coupled to reinforcing member 10, and a supporting nut 30 supporting boss 20.

Chassis base 11 is an element included in the display module of a plasma display apparatus, and supports a display panel 70 and a circuit board (not shown) of the plasma display apparatus. Chassis base 11 must sufficiently dissipate the heat generated by the display panel and the circuit board while supporting the display panel and the circuit board stably. Therefore, chassis base 11 can be formed by die-casting or pressing a metal material having high rigidity and thermal conductivity such as aluminum.

Reinforcing member 10 is mounted on chassis base 11 to reinforce the rigidity of chassis base 11. Reinforcing member 10 is installed on chassis base 11 using torxes 12, and is constructed with a penetration hole 13 for coupling to boss 20.

Boss 20 is a support member that is used when the plasma display apparatus is hung on the wall or when a cabinet and the display module are assembled, and is coupled to reinforcing member 10. Boss 20 is constructed with a threaded length 21, and a connecting portion 22 extending from threaded length 21. In addition, boss 20 can further include a head portion 24 formed on a lower end portion of threaded length 21. Head portion 24 provides auxiliary support to maintain boss 20 attached to reinforcing member 10.

Boss 20 is connected to reinforcing member 10 by threaded length 21. Threaded length 21 is constructed with a screw surface, i.e., a surface with a helical groove, on the outer portion of threaded length 21. Since penetration hole 13 of reinforcing member 10 is also constructed with a screw surface corresponding to the screw surface of threaded length 21, threaded length 21 of boss 20 can be screwed into penetration hole 13 of reinforcing member 10.

Connecting portion 22 extends from threaded length 21 in a direction away from reinforcing member 10, and is constructed with a coupling hole 23 on the upper end portion 26 of connection portion 22. Coupling hole 23 can be also constructed with a screw surface. Connecting portion 22 connects the display module to an external connecting structure (not shown) such as a support member of a wall or a cabinet. An outer surface of connecting portion 22 can be formed as a cylinder. Alternatively, a cut surface 22a can be formed on the outer surface of connecting portion 22 in an axial direction of boss 20 as shown in FIG. 2. Cut surface 22a can function as a handle when threaded length 21 of boss 20 is connected to reinforcing member 10, or can be used to determine a position of connecting portion 22 when connecting portion 22 is connected to the external connecting structure.

When threaded length 21 of boss 20 is coupled to reinforcing member 10, supporting nut 30 is coupled to the outer portion of threaded length 21 of boss 20 to press boss 20 toward reinforcing member 10. A washer 40 can be interposed between supporting nut 30 and reinforcing member 10. Supporting nut 30 is coupled to threaded length 21 by screwing along the outer screw surface of threaded length 21 to strongly press boss 20 toward reinforcing member 10. Therefore, supporting nut 30 can stably support boss 20 toward reinforcing member 10.

According to the above structure of the current embodiment, the movement of threaded length 21 in a transverse direction in FIG. 3 is restricted by supporting nut 30, and thus, boss 20 is not deformed even when a large amount of load is applied to the mounting structure of boss 20. Therefore, the mounting state of boss 20 can be kept stable.

Figure 4:
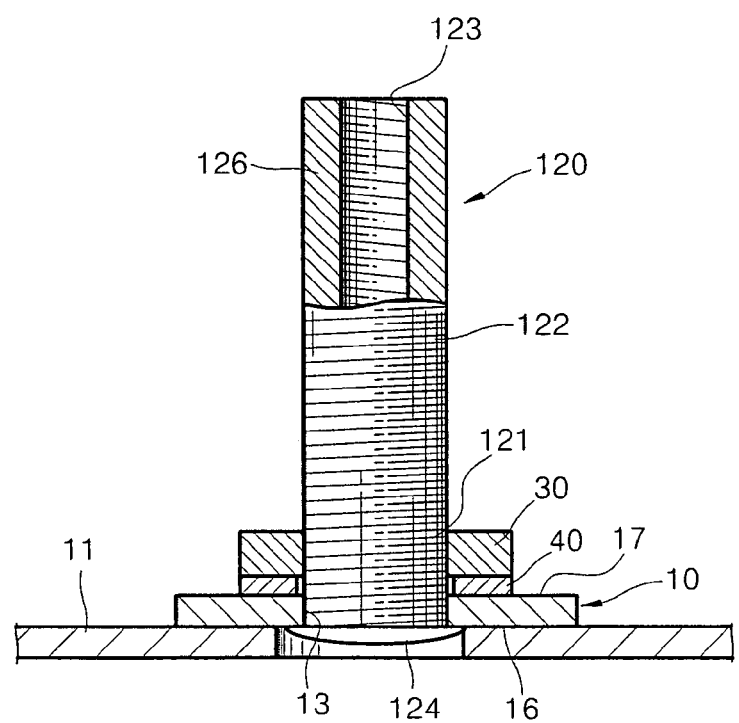
FIG. 4 is a cross-sectional view showing a side portion of a mounting structure for a boss in a display module according to another embodiment of the present invention.

FIG. 4 is a cross-sectional view showing a side portion of a mounting structure for a boss of a display module constructed as another embodiment of the principles of the present invention. Like reference numerals denote the same elements as those of the previous embodiment.

In the boss mounting structure of the current embodiment, a threaded length of a boss 120 is coupled to penetration hole 13 of reinforcing member 10, and a coupling hole 123 is formed on an upper end portion 126 of connecting portion 122 so as to connect to the external connecting. structure.

The current embodiment is different from the previous embodiment shown in FIGS. 2 and 3 in that threaded length 121 and connecting portion 122 of boss 120 are not distinguished from each other. Since the screw surface formed on the outer portion of threaded length 121 extends to connecting portion 122, the same screw surface is also formed on the outer portion of connecting portion 122. Therefore, when supporting nut 30 is coupled to boss 120, supporting nut 30 is screwed onto connecting portion 122 and then moves to threaded length 121 along the screw surface.

A head portion 124 is formed on the lower end portion of threaded length 121 of boss 120. When supporting nut 30 is coupled to boss 120, head portion 124 contacts surface 16 of reinforcing member 10 opposite to surface 17 where washer 40 and supporting nut 30 are located. Therefore, supporting nut 30 and head portion 124 restrict the movement of boss 120 in a transverse direction in FIG. 4 and support boss 120 toward reinforcing member 10, and thus, boss 120 and reinforcing member 10 are not deformed by the external shock and the mounting state of boss 120 will be kept stable.

Figure 5:
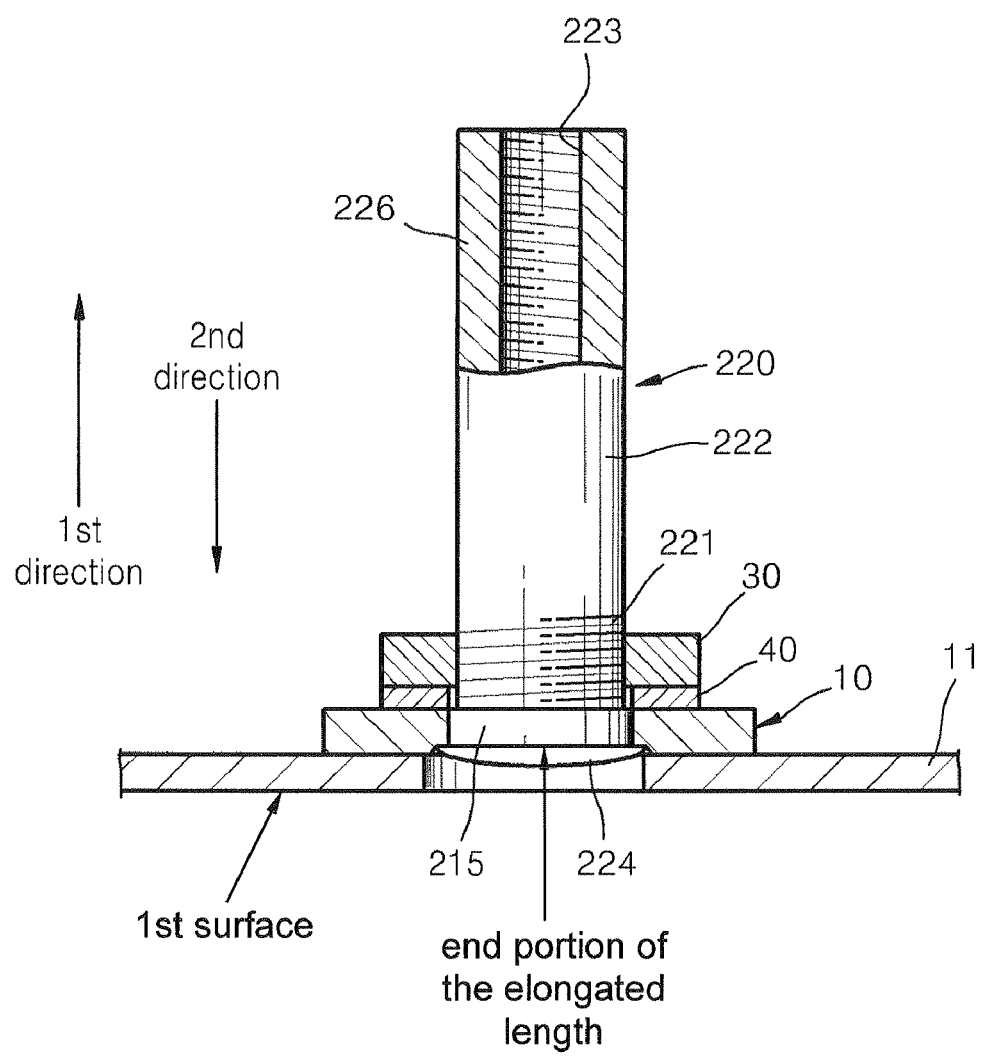
FIG. 5 is a cross-sectional view showing a side portion of a mounting structure for a boss in a display module according to another embodiment of the present invention.

FIG. 5 is a cross-sectional view showing a side portion of a mounting structure for a boss of a display module constructed as another embodiment of the principles of the present invention.

A boss 220 in the boss mounting structure according to the current embodiment includes a threaded length 221 having a helical screw surface formed on an outer portion thereof and joined to reinforcing member 10, a connecting portion 222 that defines a hollow shaft that extends longitudinally along threaded length 221 in a direction axially away from reinforcing member 10 and has a central, axially extending coupling hole 223 on an upper end portion 226 thereof, and a head portion 224 extending radially outwardly from a lower proximal end portion of threaded length 221.

Boss 220 and reinforcing member 10 are coupled to each other by pressing head portion 224 onto reinforcing member 10, and subsequently screwing supporting nut 30 along boss 220. In other words, head portion 224 is pressed upwardly against reinforcing member 10 with a strong pressing force. By way of example, head portion 224 may be riveted to reinforcing member 10. Therefore, boss 220 does not screw into reinforcing member 10 and there is no threaded surface formed in penetration hole 215 of reinforcing member 10 as shown in FIGS. 2 through 4. After head portion 224 is pressed against reinforcing member 10, supporting nut 30 is screwed along boss 220 until washer 40 is tightly clamped by nut 30, against reinforcing member 10.

Supporting nut 30 and head portion 224 restrict the movement of boss 220 in transverse direction in FIG. 5 to support boss 220 with respect to reinforcing member 10, and thus, boss 220 and reinforcing member 10 are not deformed by the external shock and the mounting structure of boss 220 can be kept stable.

Figure 6:
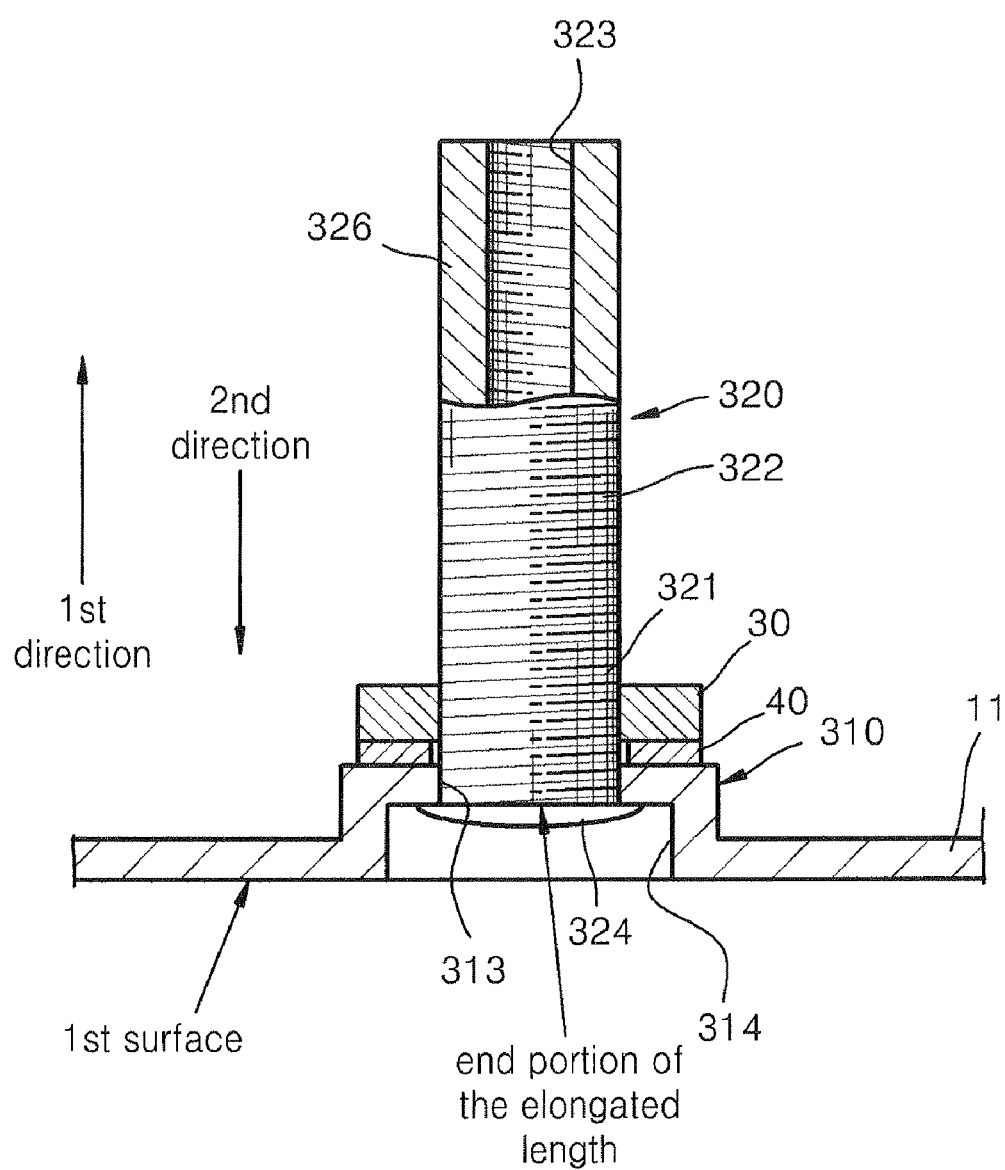
FIG. 6 is a cross-sectional view showing a side portion of a mounting structure for a boss in a display module according to another embodiment of the present invention.

FIG. 6 is a cross-sectional view showing a side portion of a mounting structure for a boss of a display module according to another embodiment of the present invention.

Boss mounting structure of FIG. 6 includes a boss 320 coupled to chassis base 11, and supporting nut 30 supporting boss 320. Boss 320 of the current embodiment is directly coupled to a protrusion portion 310 formed on chassis base 1, instead of being coupled to the reinforcing member.

Protrusion portion 310 protrudes from chassis base 11 for supporting boss 320. Protrusion portion 310 is constructed with a penetration hole 313 having a size corresponding to an outer diameter of a threaded length 321.

Threaded length 321 of boss 320 has a screw surface on an outer portion thereof, and connects boss 320 to chassis base 11. Since penetration hole 313 of protrusion portion 310 also has a screw surface corresponding to the screw surface of threaded length 321, threaded length 321 of boss 320 is screwed into penetration hole 313 of protrusion portion 310.

A connecting portion 322 extends from threaded length 321 toward an opposite direction of chassis base 11, and has a coupling hole 323 on an upper end portion 326 thereof. An outer portion of connecting portion 322 according to the current embodiment is formed as a cylinder, however, a cut surface (not shown) can be formed on the outer surface of connecting portion 322 in an axial direction of boss 320.

When threaded length 321 of boss 320 is coupled to protrusion portion 310, supporting nut 30 is coupled to the outer portion of boss 320. Supporting nut 30 can be coupled to boss 320 with washer 40 interposed between supporting nut 30 and protrusion portion 310. Supporting nut 30 is screwed onto the screw surface on the outer portion of threaded length 321 to press boss 320 strongly toward chassis base 11. Then, supporting nut 30 can stably support boss 320 toward chassis base 11.

A head portion 324 outwardly extends from the end portion of boss 320, and a concave portion 314 for receiving head portion 324 is formed in protrusion portion 310. When head portion 324 contacts an inner surface of concave portion 314, the movement of boss 320 in the transverse direction can be prevented. Therefore, boss 320 can be stably supported toward protrusion portion 310, and boss 320 and chassis base 11 are not deformed by the external shock and the mounting structure of boss 320 can be kept stable.

According to the mounting structure for the boss of the display module of the present invention, the movement of the boss in the transverse direction can be prevented by the supporting nut, and thus, the boss and the chassis are rarely deformed, and thus, the plasma display apparatus can be supported firmly and stably.

While the present invention has been particularly shown and described with reference to exemplary embodiments thereof, it will be understood by those of ordinary skill in the art that various changes in form and details maybe made therein without departing from the spirit and scope of the present invention as defined by the following claims.

What is claimed is:

1. A mounting structure for a boss of a display module, the structure comprising:
 a reinforcing member installed on a chassis base of the display module;
 a boss being different from the reinforcing member, the boss comprising:
  a threaded length having an outer portion on which a helically threaded surface is formed and being coupled to the reinforcing member;
  a connecting portion extending from the threaded length in a first direction away from the reinforcing member and having an end portion in which a coupling hole is formed; and
  a head portion extending radially outwardly from an end portion of the threaded length; and
 a supporting nut threaded onto the threaded length to press the boss toward the reinforcing member,
 the chassis base comprising a first surface which terminates the chassis base in a second direction opposite to the first direction, an end portion of the threaded length which terminates the boss in the second direction being disposed at a farther position along the first direction in comparison with the first surface of the chassis base.

2. The mounting structure of claim 1, with an end portion of the threaded length of the boss being screwed onto the reinforcing member.

3. The mounting structure of claim 1, with the boss being coupled to the reinforcing member by pressing the head portion into the reinforcing member.

4. The mounting structure of claim 1, with the connecting portion comprising a helically threaded surface extending from the threaded surface of the threaded length on an outer portion of the connecting portion.

5. The mounting structure of claim 1, with at least one cut surface formed on an outer surface of the connecting portion and extending in an axial direction of the boss.

6. The mounting structure of claim 1, with the supporting nut being coupled to the boss with a washer interposed between the supporting nut and the reinforcing member.

7. A mounting structure for a boss of a display module, the structure comprising:
 a boss, comprising:
  an elongated length having an outer portion on which a helically threaded surface is continuously formed, the elongated length being coupled to a chassis base of the display module,
  a connecting portion which extends from the threaded surface of the elongated length in a first direction away from the chassis base and has an end portion in which a coupling hole is formed, and the chassis base comprising a first surface which terminates the chassis base in a second direction opposite to the first direction, an end portion of the elongated length which terminates the boss in the second direction being disposed at a farther position along the first direction in comparison with the first surface of the chassis base; and a supporting nut threaded onto the outer portion of the elongated length to press the boss toward the chassis base.

8. The mounting structure of claim 7, with the chassis base comprising a protrusion portion having a penetration hole corresponding to the elongated length, and an end portion of the elongated length is threadingly engaged with the penetration hole of the protrusion portion.

9. The mounting structure of claim 8, with the boss further comprising a head portion extending outwardly from the end portion of the elongated length, and with the protrusion portion comprising a concave portion to receive the head portion.

10. The mounting structure of claim 9, with the supporting nut being coupled to the boss with a washer interposed between the supporting nut and the protrusion portion.

11. The mounting structure of claim 7, with the boss further comprising a head portion outwardly extending from the end portion of the elongated length, the chassis base comprising a protrusion portion having a penetration hole corresponding to the elongated length and a concave portion receiving the head portion, and the head portion being pressed into the concave portion so that the boss is coupled to the protrusion portion.

12. The mounting structure of claim 7, with the connecting portion comprising a helically threaded surface extending from the threaded surface of the elongated length on an outer portion of the connecting portion.

13. The mounting structure of claim 7, with at least one cut surface formed on the outer surface of the connecting portion and extending in an axial direction of the boss.

* * * * *